United States Patent
Kimball

(10) Patent No.: US 6,449,560 B1
(45) Date of Patent: *Sep. 10, 2002

(54) SONIC WELL LOGGING WITH MULTIWAVE PROCESSING UTILIZING A REDUCED PROPAGATOR MATRIX

(75) Inventor: Christopher V. Kimball, West Redding, CT (US)

(73) Assignee: Schlumberger Technology Corporation, Ridgefield, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/552,075

(22) Filed: Apr. 19, 2000

(51) Int. Cl.⁷ .............................................. G06F 19/00
(52) U.S. Cl. .............................................. 702/6; 702/17
(58) Field of Search ........................................ 702/6, 17

(56) References Cited

U.S. PATENT DOCUMENTS

| | | | |
|---|---|---|---|
| 4,594,691 A | 6/1986 | Kimball et al. | 367/32 |
| 5,047,991 A | 9/1991 | Hsu | 367/25 |
| 5,278,805 A | 1/1994 | Kimball | 367/32 |
| 5,687,138 A | 11/1997 | Kimball et al. | 367/31 |
| 5,808,963 A | 9/1998 | Esmersoy | 367/31 |

OTHER PUBLICATIONS

Ekstrom, M.P. Dispersion Estimation from Borehole Acoustic Arrays Using a Modified Matrix pencil Algorithm. *Presented at 29$^{th}$ Asilomar Conference on Signals, Systems, and Computers*, Pacific Grove, CA. Oct. 31, 1995.

Hsu, Kai and Esmersoy, Cengiz. Parametric Estimation of Phase and Group Slownesses from Sonic Logging Waveforms. *Geophysics*, vol. 57, No. 8 (Aug. 1992). pp. 978–985.

Esmersoy et al. "Dipole Shear Anisotropy Logging". *60$^{th}$ Annual International Mtg., Soc. Explor. Geophys.*, Expanded Abstracts, (1994) pp. 1139–1142.

Esmersoy, C. "Inversion of P and SV Waves from Multicomponent Offset Vertical Seismic Profiles". *Geophysics*. (Jan. 1990).

(List continued on next page.)

*Primary Examiner*—Edward Lefkowitz
*Assistant Examiner*—Anthony Gutierrez
(74) *Attorney, Agent, or Firm*—Martin M. Novack; William B. Batzer; John J. Ryberg

(57) ABSTRACT

A method of determining acoustic properties of borehole earth formations, comprising: (a) transmitting acoustic energy from a transmitter location and receiving acoustic energy (a portion of which traveled through the formations) at a plurality of receiver locations in the borehole; (b) deriving data signals from the received acoustic energy; (c) selecting model values of the acoustic properties; (d) producing an intermediate matrix; (e) performing a singular value decomposition on the intermediate matrix to obtain a basis matrix of eigenvectors; (f) deriving a propagator matrix as a function of the model values; (g) producing a reduced propagator matrix from the propagator and basis matrices; (h) producing a test statistic using the data signals and the reduced propagator matrix; and (i) repeating steps (c)–(h) for different combinations of model values, and selecting, as output acoustic property values, the combination of model values resulting in a maximized test statistic.

50 Claims, 14 Drawing Sheets

OTHER PUBLICATIONS

Harrison et al. "Acquisition and Analysis of Sonic Waveforms From a Borehole Monopole and Dipole Source for Determination of Compressional and Shear Speeds and Their Relation to Rock Mechanical Properties and Surface Seismic Data", *Society of Petroleum Engineers*, SPE 20557 (1990).

Kimball C.V. et al. "Error Analysis of Maximum Likelihood Estimates from One or More Dispersive Waves". *IEEE Trans. on Signal Processing,.* vol. 43, No. 12 (1995) pp. 2928–2936.

Kimball, C.V. "Error Bars for Sonic Slowness Measurements". Geophysics, vol. 63, No. 2, (Mar.–Apr. 1998) pp. 345–353.

Kimball, C.V. "Shear Slowness Measurement by Dispersive Processing of the Borehole Flexural Mode" *Geophysics*, vol. 63 (1998) pp. 337–344.

Kimball, C.V. and Marzetta, T. L. "Semblence Processing of Borehole Acoustic Array Data". *Geophysics*, vol. 49 (1986) pp. 274–281.

Parks et al. "Velocity Estimation from Short–Time Temporal and Spatial Frequency Estimates". *Proc. of ICASSP* (1992) pp. 399–402.

Scharf, Louis L. "Statistical Signal Processing". Chapter 2 "Rudiments of Linear Algebra and Multivariate Normal Theory". *Addison–Wesley Publ. Co,*.pp. 23–75.

Mars, Jerome et al. *Filter Formulation and Wavefield Separation of Cross–Well Seismic Data. Geophysical Prospectong* 47 (1999). pp. 611–636.

| PROCESSING | BIAS (μs/ft) | STD. DEV. (μs/ft) |
|---|---|---|
| CRAMER-RAO BOUND | | 0.88 |
| 600 μs WINDOW | | |
| LMSE | −0.02 | 1.20 |
| WINDOWED LMSE | 0.01 | 1.17 |
| NEW PROCESSING | −0.01 | 0.90 |
| 1200 μs WINDOW | | |
| LMSE | −0.01 | 1.20 |
| WINDOWED LMSE | 1.56 | 1.21 |
| NEW PROCESSING | −0.01 | 0.93 |

SONIC WELL LOGGING WITH MULTIWAVE PROCESSING UTILIZING A REDUCED PROPAGATOR MATRIX

FIELD OF THE INVENTION

This invention relates to investigation of earth formation and, more particularly, to a method and apparatus for determining properties of earth formations using sonic well logging with multiwave processing.

BACKGROUND OF THE INVENTION

It is well known that mechanical disturbances can be used to establish acoustic waves in earth formations surrounding a borehole, and the properties of these waves can be measured to obtain important information about the formations through which the waves have propagated. Parameters of compressional, shear and Stoneley waves, such as their velocity (or its inverse, slowness) in the formation and in the borehole, can be indicators of formation characteristics that help in evaluation of the location and/or producibility of hydrocarbon resources.

An example of a logging device that has been used to obtain and analyze sonic logging measurements of formations surrounding an earth borehole is called a Dipole Shear Sonic Imager ("DST"—trademark of Schlumberger) and is of the type described in Harrison et al., "Acquisition and Analysis of Sonic Waveforms From a Borehole Monopole And Dipole Source For The Determination Of compressional And Shear Speeds And Their Relation To Rock Mechanical Properties And Surface Seismic Data", Society of Petroleum Engineers, SPE 20557, 1990.

Commercial sonic logging tool processing techniques conventionally "window" the acquired sonic waveforms. [For description of other prior logging techniques using sonic arrays, and approaches in which windowing of acquired waveforms has been used, see, for example, Kimball, C. V., and Marzetta, T. L., "Semblance Processing Of Borehole Acoustic Array Data, Geophysics, 49, pp. 274–281, 1986; U.S. Pat. Nos. 4,594,691; 5,278,805; and Esmersoy, C., Koster, K., Williams, M., Boyd, A., and Kane, M., "Dipole Shear Anisotropy Logging", 60-th Ann. Internet. Mtg., Soc. Explor. Geophys., Expanded Abstracts. pp. 1139–1142, 1994.] The windowing procedure employs a time window of selected duration that is judiciously positioned to separate a desired wave from other waveform components because the subsequent processing is valid only for particular single wave types. Positioning the window has always been a problem because the output estimates depend significantly on window position. To believe an estimate, one must believe the window is positioned properly. In practice, window positions are often untenable from a physical point of view. Moreover, windowing is known to introduce bias in the measurement (see Parks, T. W., Morris, C. F., and Ingram, J. D., "Velocity Estimation From Short-Time Temporal And Spatial Frequency Estimates", Proc. of ICASSP, pp. 399–402, 1992).

Multiwave processing, that is, processing multiple waves jointly, offers advantages in many situations, particularly when the wave model includes tool arrivals. [See Esmersoy, C., "Inversion Of P And SV Waves From Multicomponent Offset Vertical Seismic Profiles", Geophysics, January 1990; Kimball, C. V., Lewicki, P. and Wijeyesekera, N., "Error Analysis Of Maximum Likelihood Estimates From One or More Dispersive Waves", IEEE Trans. On Signal Processing, 43, No. 12, pp. 2928–2936, 1995.] Recent multiwave processing approaches are described, for example, in Kimball, C. V., "Shear Slowness Measurement By Dispersive Processing Of The Borehole Flexural Mode, Geophysics, 63, pp. 337–344, 1998; and U.S. Pat. No. 5,687,138. Although multiwave processing is intended to process more than one wave (i.e., wave type), the intended number of waves is usually less than the number of waves actually present in the logging data. Moreover, performance in estimating formation characteristics can tend to decrease as the number of waves included in the processing increases, so more waves in the model doesn't of itself lead to better estimates.

It is among the objects of the present invention to provide an improved multiwave processing technique and apparatus that overcomes shortcomings of prior art approaches, including the limitations of existing windowing processing.

SUMMARY OF THE INVENTION

Applicant has discovered that by redefining the underlying signal model, multiwave processing can attain the benefits of windowing without the uncertainties of window positioning and without bias. This permits application of least mean square estimation ("LMSE") without the need to resort to ad hoc techniques.

In accordance with an embodiment of the invention, a method is set forth for determining acoustic properties, such as compressional wave slowness and shear wave slowness, of earth formations surrounding a borehole, comprising the following steps: (a) transmitting acoustic energy from a transmitter location and receiving acoustic energy at a plurality of receiver locations in the borehole, at least a portion of the received acoustic energy having travelled through the formations; (b) deriving data signals from the acoustic energy received at the receiver locations; (c) selecting model values of the acoustic properties; (d) producing an intermediate matrix that is a function of a window matrix, the window matrix being a function of at least one of the model values; (e) performing a singular value decomposition on the intermediate matrix to obtain a basis matrix of eigenvectors; (f) deriving a propagator matrix as a function of the model values; (g) producing a reduced propagator matrix from the propagator matrix and the basis matrix; (h) producing a test statistic using the data signals and the reduced propagator matrix; (i) repeating steps (c) through (h) for different combinations of model values, and selecting, as output acoustic property values, the combination of model values that results in a maximized test statistic.

In a preferred embodiment of the invention, the steps (d), (e), and (f) are each performed for a plurality of different wave types (e.g. compressional waves, shear waves, Stoneley waves, and flexural waves). Also in this embodiment, the step (e) further includes truncating said eigenvectors of the basis matrix to produce a reduced basis matrix, and the step (g) comprises producing the reduced propagator matrix from the propagator matrix and the reduced basis matrix. Also in this embodiment, the step (d) of producing an intermediate matrix comprises producing an intermediate matrix that is also a function of a filter matrix. The window matrix is a time domain matrix and said filter matrix is a frequency domain matrix, and the intermediate matrix is formed by transforming the window matrix to the frequency domain, implementing filtering on the transformed window matrix, and transforming the result to the time domain.

The multiwave processing of the present invention offers potential advantages in many well logging applications. Some examples of these are: so-called labelling-free monopole compressional, shear, and Stoneley processing (without the need for long transmitter-to-receiver spacings to have labelled windowed arrivals); centralized and eccentered Stoneley/flexural wave processing (processing in situations where eccentering or tool imperfections result in waves other than pure flexural waves, such as Stoneley waves, that would ordinarily make it more difficult to invert for shear slowness); fast and slow shear processing in anisotropic formations; and combinations of the above, with or without the presence of so-called tool arrivals of waves that propagate through the logging tool itself. Reference an can be made, for example, to C. Esmersoy, Inversion Of P And SV Waves From Multicomponent Offset Vertical Seismic Profiles, Geophysics, January, 1990; C. V. Kimball et al., Error Analysis Of Maximum Likelihood Estimates From One Or More Dispersive Waves, IEEE Trans. On Signal Processing, 43, No. 12, pp. 2928–2936, 1995; U.S. Pat. Nos. 5,687,138; and 5,808,963.

Further features and advantages of the invention will become more readily apparent from the following detailed description when taken in conjunction with the accompanying drawings.

DETAILED DESCRIPTION

Figure 1:
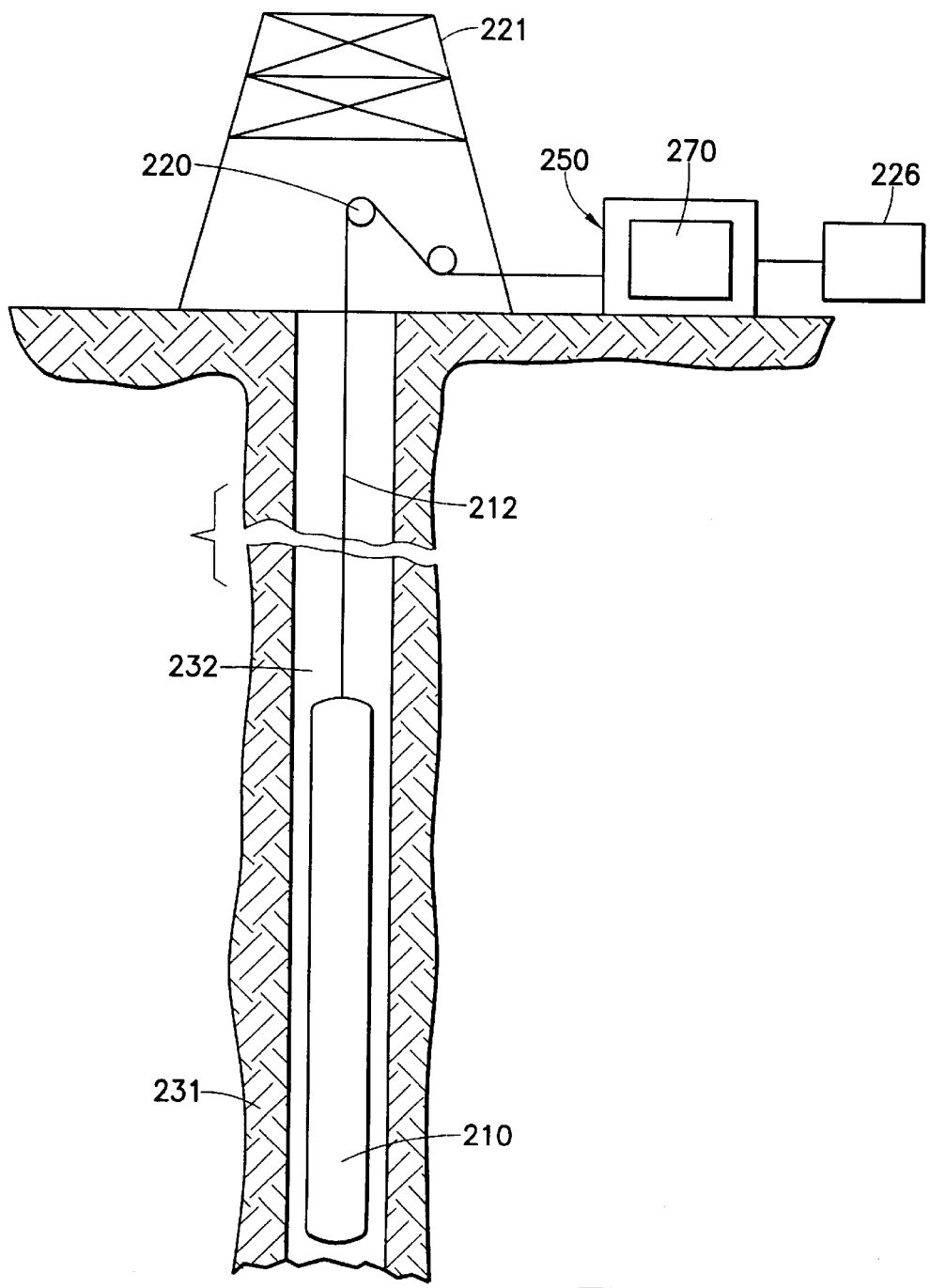
FIG. 1 is a diagram, partially in block form, of a type of apparatus that can be used in practicing an embodiment of the invention.

Referring to FIG. 1, there is shown a type of apparatus which can be used in practicing an embodiment of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions-not separately shown), standard peripheral equipment (not separately shown), and recorder 226.

Figure 2:
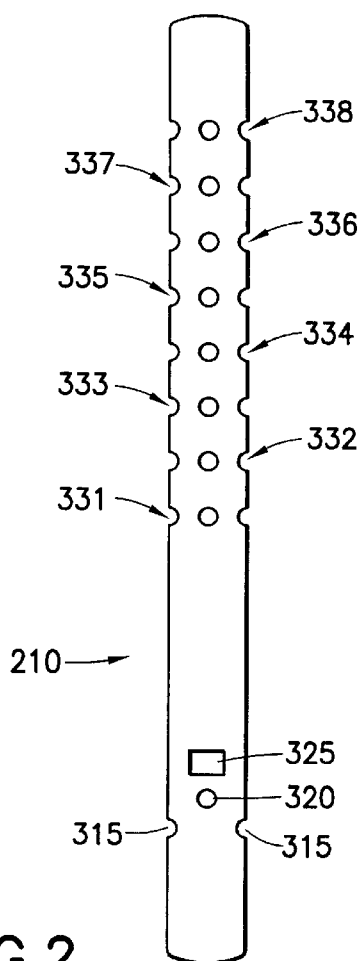
FIG. 2 is a simplified diagram of a type of downhole logging device that can be used in practicing an embodiment of the invention.
Figure 3:
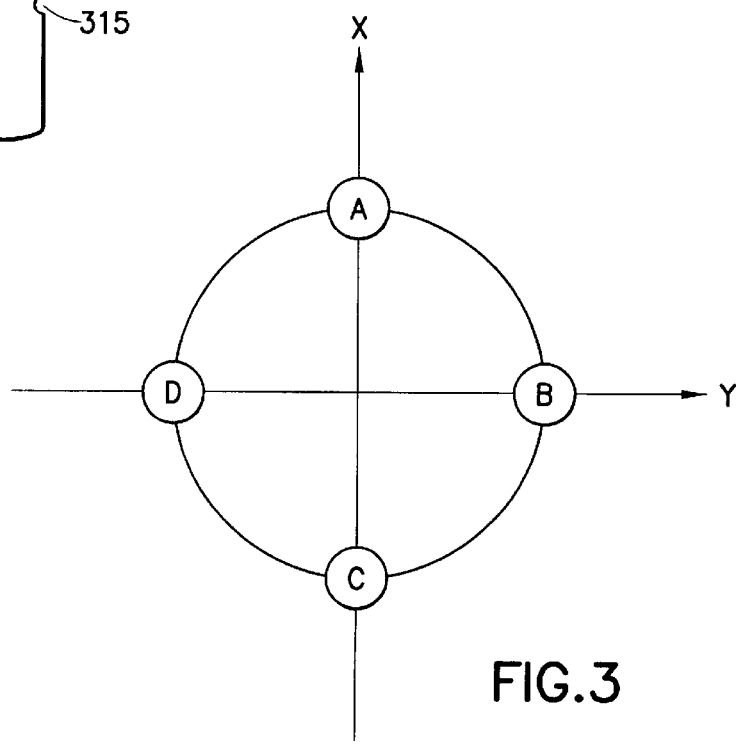
FIG. 3 is a diagram illustrating, in cross-section, the placement of hydrophones that can be used at a receiver station in the logging device of FIG. 3.

The logging device 210 may be, for example, a Dipole Shear Sonic Imager ("DSI"—trademark of Schlumberger) of the type described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. Further details of the logging device 210 are shown in FIG. 2. The logging device 210 includes crossed dipole transmitters 315 and 320 (only one end of dipole 320 being visible) and a monopole transmitter 325, so that waves including compressional, shear, Stoneley, and flexural can be excited. Eight spaced apart receiver stations, designated 331 through 338 each comprise four receiver hydrophones mounted azimuthally at ninety degree intervals in the surface of the cylindrical logging device. FIG. 3 shows the hydrophones, designated A, B, C, and D. In an example shown in FIG. 4, an X component can be obtained by subtracting the signals received at A and C (i.e., A-C), and a Y component can be obtained by subtracting the signals received at B and D (i.e., B-D). With four receiver elements at each receiver station, there are a total of thirty two receiver elements in this example. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the 32 individual receiver elements located at the eight receiver stations which are spaced six inches apart. At each station, four receivers are mounted as shown in FIG. 3 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexes, filters, amplifies and channels the signals from the 32 receiver elements to 8 parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 4:
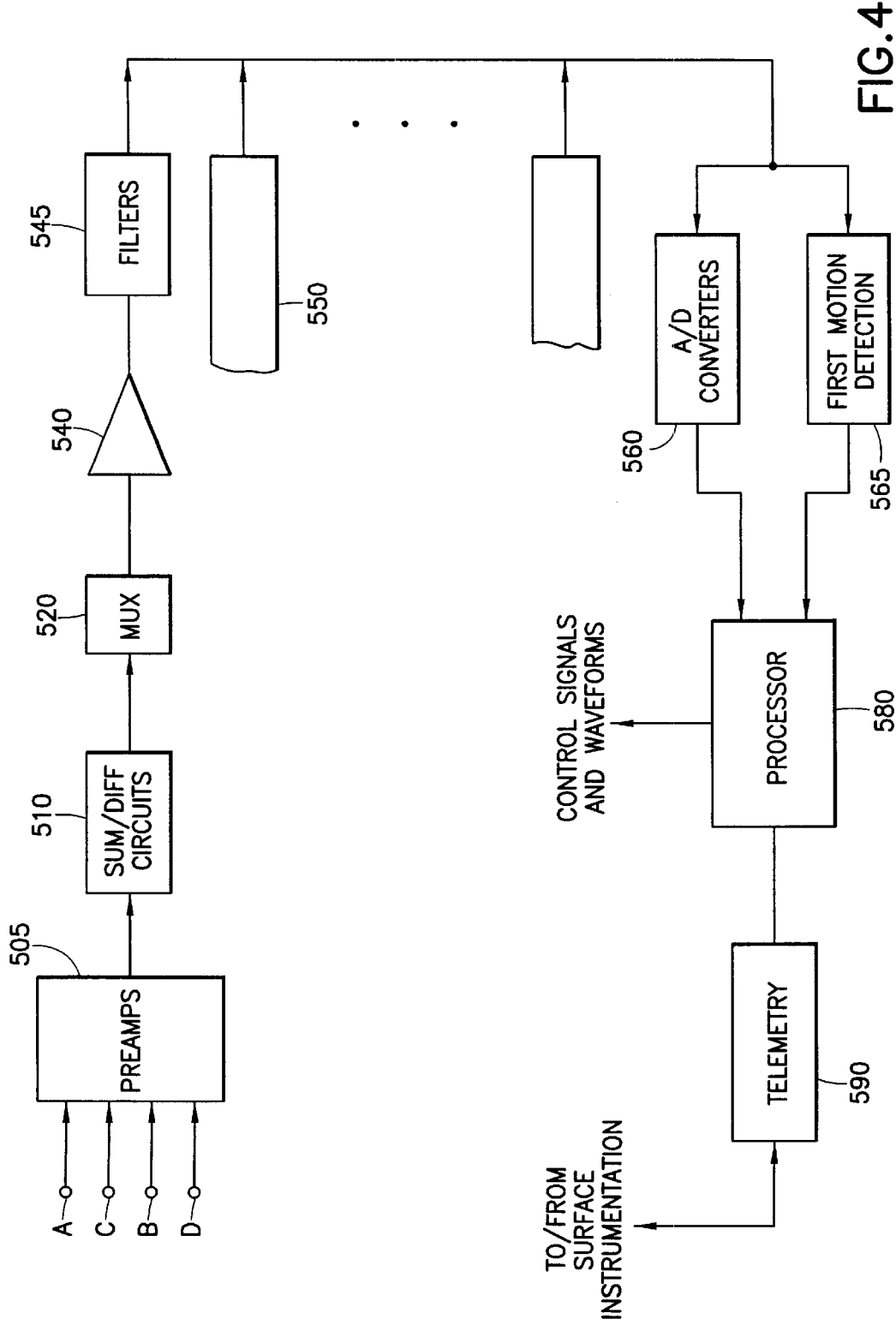
FIG. 4 is a block diagram of a portion of the electronics of the FIG. 2 logging device.

FIG. 4 shows an example of the acquisition signal path in block diagram form for one of the eight receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. After digitization, the eight waveforms are passes to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590.

In the FIG. 2 embodiment, the processing of signals recorded uphole can be implemented using a processor 170, such as a suitably programmed general purpose digital processor with memory and peripherals conventionally provided. It will be understood, however, that the processing need not be performed at the wellsite, and that signals derived at the wellsite can be processed at a remote location.

Before describing the routine for controlling the processor for operation in accordance with an embodiment of the invention, some of the theory underlying the invention will be set forth. Consider the case in which t real parameters $\Theta=(\theta_1 \ldots \theta_t)$ are to be estimated, from data containing q waves characterized by their phase slownesses, $\alpha_j(\omega)$. Given an array of m receivers at positions $\delta_j$, j=1 ... m and a signal represented in terms of Fourier coefficients at n frequencies $\omega_i$, i=1 ... n, the conventional multiwave processing model is:

$$\underset{s}{mnx1} = \underset{P(\Theta)}{mnxnq} \underset{a}{nqx1} \quad (1)$$

$$\underset{x}{mnx1} = \underset{s}{mnx1} + \underset{n}{mnx1} \quad (2)$$

where s represents the signal, $P(\Theta)$ is a propagator, a are the wave spectra, x is the data, n is the noise, and $$P = \{P_{jk}\} \quad (3)$$

$$\underset{P_{jk}}{nxn} = \begin{bmatrix} e^{j\omega_1\alpha_k\delta_j} & 0 & \cdots & 0 \\ 0 & e^{j\omega_2\alpha_k\delta_j} & \cdots & 0 \\ 0 & 0 & \cdots & 0 \\ 0 & 0 & \cdots & e^{j\omega_n\alpha_k\delta_j} \end{bmatrix} \quad (4)$$

The diagonal structure of the $P_{jk}$ matrices allows decomposition of the processing into n subprocessings. Here the nq complex wave spectral values a and the t real physical parameters $\Theta$ are unknowns to be determined from the nm complex data points. The nq spectral values in a represent 2nq degrees of freedom introduced into the model to account for the inherent uncertainty of the amplitudes and shape of the waves.

A measure of potential processing gain is the ratio of the number of input data points to the number of estimated values:

$$\eta = \frac{2nm}{2nq+t} \quad (5)$$

$$\approx m/q \quad (6)$$

for t<nq. Significantly, $\eta$ doesn't depend on the number of spectral points in each waveform. Thus, long acquisitions (large n) with potentially separated waves have the same $\eta$ as short acquisitions.

This paradox arises because Equation (1) doesn't model each wave's time/frequency support. In fact, Equation (1) remains valid even if each wave occupies the entire time extent of the data. It also remains valid if each wave may have spectral support anywhere in the n frequencies in the acquisition. (The performance associated with the processing does depend on the distribution of each wave's time and frequency support; data having waves that are isolated in either time or frequency will have better parameter estimates.)

Thus, the conventional model includes only dispersion curve information about the data and allows arbitrary time/frequency support for waves having these dispersions. This results in large degrees of freedom (2nq) and in a potentially reduced processing gain.

Windowing is an external and ad hoc method of incorporating knowledge of a wave's time support into the processing. Windowed LMSE methods, such as "STC" (mstk trademark of Schlumberger) (see U.S. Pat. No. 4,594, 691), "DSTC"(mark of Schlumberger) (see U.S. Pat. No. 5,278,805), and so-called Stoneley Permeability II (see U.S. Pat. No. 5,687,138), incorporate a time support model which is disjoint from the dispersion model. An advantage of the technique hereof is that it incorporates the knowledge of both wave dispersion and time/frequency support into a new model, and apply "pure" LMSE multiwave methods to that model. This is achieved by representing the uncertain time/frequency support entirely in the vector a through an orthonormal basis.

In an embodiment hereof, the k-th wave's time and frequency support is defined in terms of an orthonormal basis $U_k$ for the wave at $\delta=0$, that is $e^{j\omega_i\alpha_k\delta}$ for all $\omega_i$, i=1, . . . , n. The axial reference position $\delta=0$ can be taken as either the source location or the first receiver; the source location appears to be the most natural. Let $a^k$ be the n point spectrum of the k-th wave modelled on the basis $U^k$ having $r_k$ basis vectors. Then $$a^k = U^k c^k \tag{7}$$

where $$U^k = [u_1^k \ldots u_{r_k}^k] \tag{8}$$

$$|u_i^k|^2 = 1 \tag{9}$$

$$(u_i^k)^T u_j^k = 0, \tag{10}$$

i≠j and $c^k$ is a vector of $r^k$ arbitrary complex weights. That is, the model provides $2r_k$ degrees of freedom for the wave's time/frequency support expressed as an n point spectrum $a^k$.

The orthonormal basis for $a^k$ at δ=0 can be associated with a particular center time. A Gaussian window gives rise to a simple definition of center time. For some waves, advancing or delaying the center time of the basis may be appropriate to account for delays associated with each wave's complex excitation spectrum. Such pure time shifts of the window correspond to pure time shifts of the basis functions. Thus the basis of any wave at δ=0 can be offset to alternative positions, if desired.

In general, if a wave is perfectly expressed by the basis vectors at δ=0, then the wave at some receiver position will not be perfectly expressed on these basis vectors or time shifts of these basis vectors. That is, dispersive propagation doesn't preserve the orthonormal basis. This has no consequences for the processing hereof which-only requires orthogonality at δ=0 for each wave's basis vectors.

Many ways of defining the orthonormal basis $U^k$ are possible. one preferred method is to choose filtering and windowing matrices $H^k$, $W^k$ operating in the frequency and time domains respectively. Both are square diagonal matrices containing the desired filter and window characteristics along their diagonals. Let F be the forward Fourier transform matrix, a square unitary matrix, and let $F^T$ be the conjugate transpose of F. $F^T$ is the inverse Fourier transform matrix, $FF^T = F^T F = I$. Define the n×n matrix:

$$G^k = FW^k F^T H^k. \tag{12}$$

then $$\bar{a}^k = G^k a^k \tag{13}$$

is a filtered-then-windowed version of $a^k$. $G^k$ takes an arbitrary wave spectrum $a^k$ and restricts it to the frequency and time support specified by $H^k$ and $W^k$. (Alternatively, a matrix generating a windowed-then-filtered version of $a^k$ could be constructed, $G^k = HFWF^T$. This matrix will in general be different from $G^k$ above.) In general, $G^k$ is not Hermitian, that is, $(G^k)^T \neq G^k$. The dimensionality of $\bar{a}^k$ still n, however.

Consider the singular value decomposition (SVD) of $G^k$.

$$G^k = U^k L^k (V^k)^T \tag{14}$$

where the eigenvectors and eigenvalues are ordered in the usual way (with the eigenvalues of largest magnitude first). The n columns of $U^k$ are orthonormal vectors which span n-dimensional space of waveforms at the source. $\bar{a}^k$ can be approximated by the first $r_k$ eigenvectors of $U^k$. These eigenvectors form an orthonormal basis for an approximate version of $\bar{a}^k_1$, $\bar{a}_{r_k}^k$ given filtering and windowing operations. $\bar{a}_{r_k}^k$ is a good approximation of $\bar{a}^k$ in the sense that it retains most of the energy in $a^k$ that survives multiplication by the $G^k$ matrix. $(G_{r_k}^k U^k L_{r_k} V^k)^T$ is the least squares rank $r^k$ approximation to $G^k$ (see Scharf, L. L., "Statistical Signal Processing Detection, Estimation And Time Series Analysis", Addison Wesley Publishing Co., July 1991).) The restriction to $r^k$ eigenvalues/eigenvectors removes those components of $a^k$ that were attenuated by the $G^k$ matrix; that is, those that don't meet the conditions set by $G^k$.

Roughly speaking, $r^k$ eigenvectors will be a reasonable approximation to $a^k$ if $r^k > W^k T^k$, where $W^k$ is the bandwidth of the filter $H^k$ and $T^k$ is the time extent of the window $W^k$. For most applications, the time/frequency extent of the wave at the source is far less than n, thus $r^k << n$.

Note that if neither filtering nor windowing are done ($H^k = I$, $W^k = I$), then $G^k = I$ and the orthonormal basis is the usual sinusoidal basis with $r^k = n$.

Let $$r = \sum_{k=1}^{q} r^k \tag{15}$$

be the total number of retained eigenvectors for all q waves. Define a new nm×r model matrix $P_e$ as $$\underset{P_e}{\overset{nm \times r}{}} = P \begin{bmatrix} U^1 & 0 & 0 & 0 \\ 0 & U^2 & 0 & 0 \\ 0 & 0 & \cdots & 0 \\ 0 & 0 & 0 & U^q \end{bmatrix} \tag{16}$$

The signal for the new model is then $$s = P_e \tilde{a} \tag{17}$$

$$\tilde{a} = \begin{bmatrix} c^1 \\ c^2 \\ \vdots \\ c^q \end{bmatrix} \tag{18}$$

$\tilde{a}$ contains the unknown complex eigenweights for each of the q waves.

Suppose that r=εnq, ε<<1, then $$\eta = \frac{2mn}{2\varepsilon nq + t} \tag{19}$$

so that η is improved by a factor of about 1/ε. In most applications ε<0.1 and the improvement in η is at least a factor of 10.

Several points about the technique hereof can be noted.

At a given receiver, the time support of a wave can be approximately viewed as the support of the wave at δ=0 propagated at the group slowness.

The $U^k$ matrices may depend on the parameters Θ.

The detailed error analysis available for the prior art processing model is equally applicable to the processing model hereof as long as the derivatives of the $P_e$ matrix with respect to the parameters $\Theta_i$ are used instead of those of the P matrix (see Kimball, C. V., Lewicki, P. and Wijeyesekera, N., Error Analysis Of Maximum Likelihood Estimates From One or More Dispersive Waves: IEEE Trans. On Signal Processing, 43, No. 12, 1995 pp. 2928–2936).

In LMSE estimation, estimates are found by maximizing a test statistic derived from the model matrices (P,$P_e$). [The maximized test statistic is indicative of a minimized error between data and model.] P contains diagonal submatrices for each wave (Equation (3)), and $P_e$ generally has all non-zero elements. Although $P_e$ usually has reduced rank r relative to the original model's rank nq, $P_e$ is a much more complicated matrix, which can be a cause for concern in some cases.

The LMSE test statistic for a model matrix P is:

$$T(\Theta)=|Q(\Theta)x|^2 \tag{21}$$

$$Q=P(P^TP)^{-1}P^T \tag{22}$$

where Q is an mn×mn projection matrix. Without any restrictions, however, the test statistic can be re-written in terms of the singular value decomposition of the P matrix. Let $$P=U_P L_P V_P^T \tag{23}$$

then $$T(\Theta)=|U_P^T x|^2 \tag{24}$$

That is, the test statistic is the sum of the magnitude-squared values of inner products of the data with the (left) eigenvectors of the P matrix.

For a 2-wave problem with the typical data obtained using the above described type of device, the size of P is 2048×512. The difficulty of the singular value decomposition depends primarily on the rank of P, nq=512. Finding the singular value decomposition of P would be a challenging numerical problem. With the model hereof, the rank of $P_e$ is r<<nq and the singular value decomposition is much less difficult.

Let $$P_e=U_e L_e V_e^T \tag{25}$$

$$T(\Theta)=|U_e^T x|^2 \tag{26}$$

For each value of Θ, calculation of the test statistic from the r eigenvectors requires storage of nmr complex points and approximately nmr multiply and add operations. Applying the full Q matrix to x in the general case would require storage of $(nm)^2$ points and $(nm)^2$ operations. With the diagonal structure of P in the original model, the test statistic is generated with a storage of nq points and approximately nmq operations. The eigenvector approach is more costly in storage by a factor of mr/q and in operations by a factor of r/q. These storage and computational expenses may be less than those expended in window positioning, however.

The LMSE test statistic of the present embodiment is unnormalized. That is, the test statistic is scale dependent. This isn't necessarily a problem, but in some instances, a normalized, scale-independent statistic may be convenient. A robust, general normalization is to create a semblance ρ by normalizing by the total energy.

$$\rho = \frac{|U_e^T x|^2}{|x|^2} \tag{27}$$

Because $U_e^T$ is a projection of x onto a coordinate in signal space ρ<1. Signals that perfectly fit the model in a noise-free environment have ρ=1. Since $|x|^2$ is a constant, the normalization is fast and has no effect on the estimated values.

Figure 5A:
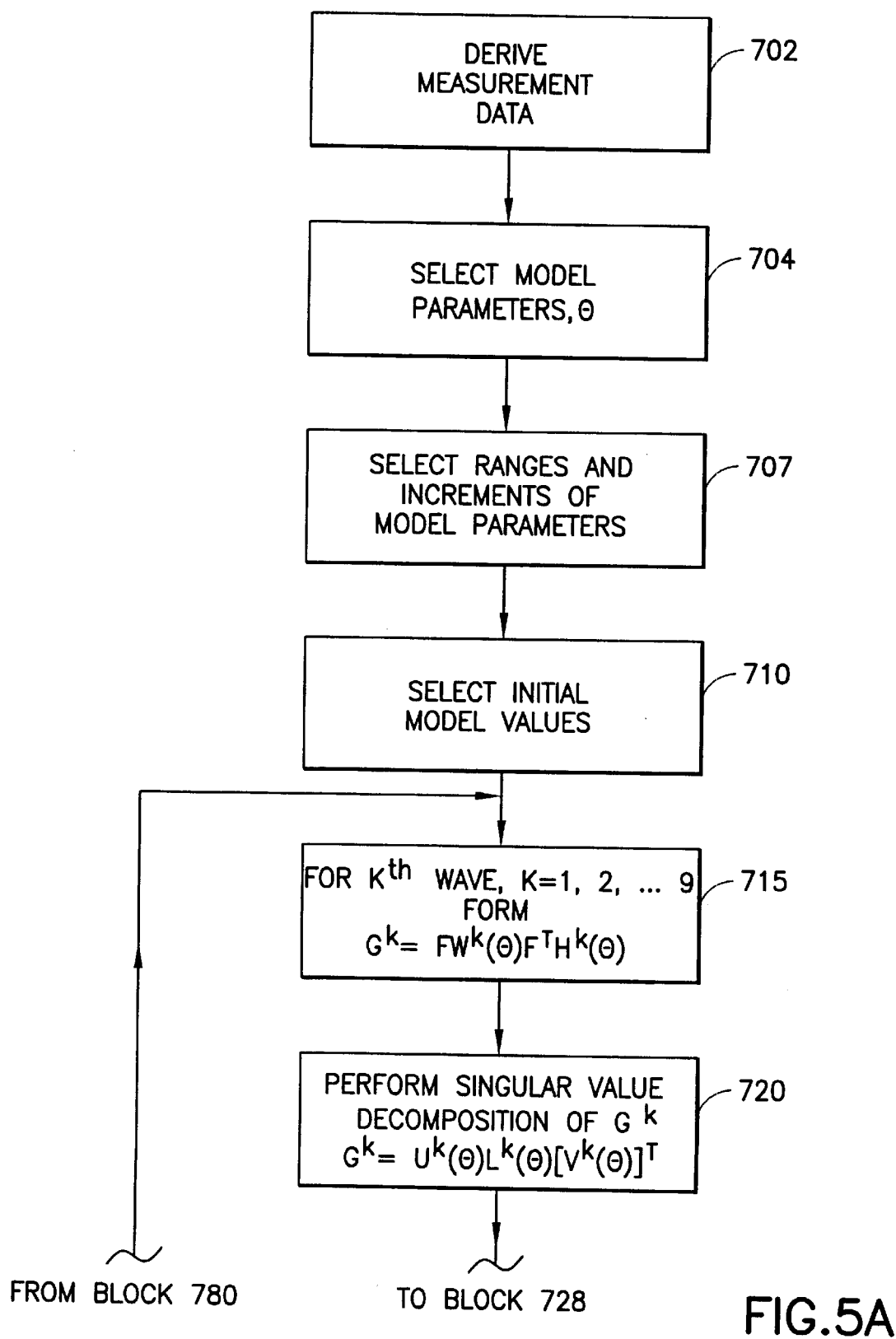
FIG. 5, which includes FIGS. 5A and 5C placed one below another, is a flow diagram of a routine for programming a processor in accordance with an embodiment of the invention.
Figure 5B:
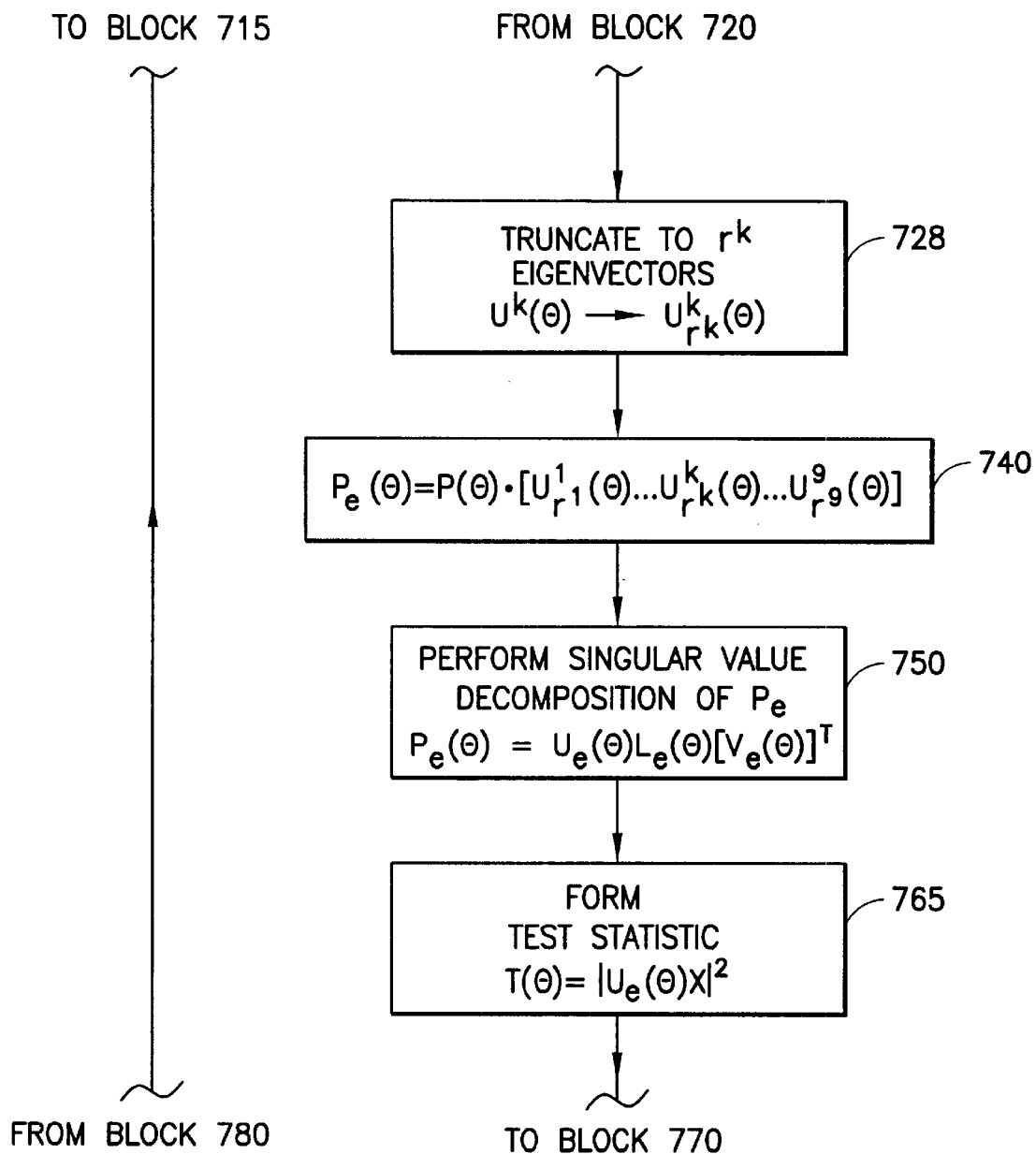
Figure 5C:
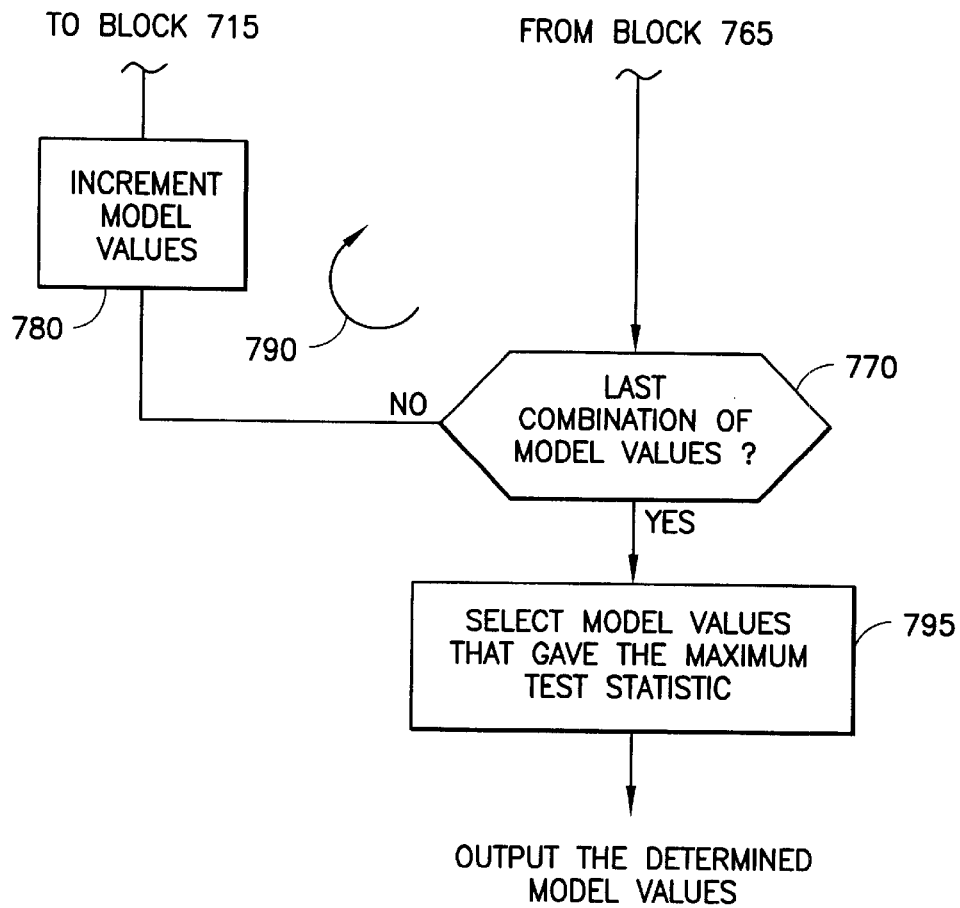

Referring to FIG. 5, there is shown a flow diagram of a routine that can be used for programming a processor, such as the processor 170 or other suitable general or special purpose processor, in accordance with an embodiment of the invention. The block 702 represents the deriving of measurement data taken with the tool (e.g. FIG. 3) over a range of depth levels to be processed. In an example hereof, the data at each depth level includes 512 samples at each of eight receiver locations. The data samples can be conventionally converted to Fourier coefficients in the frequency domain. The block 704 represents operator selection of the model parameters Θ for the model to be employed. The model parameters may comprise, for example, a plurality of parameters selected from: compressional slowness (p), shear slowness (s), borehole diameter, borehole fluid slowness, and formation/borehole-fluid density ratio. Next, the block 707 represents operator selection of ranges and increments for the model parameters to be varied. For example, the range and increment for compressional slowness may be 50 μsec/ft to 160 μsec/ft with an increment of 2 μsec/ft, and the range and increment for shear slowness may be 100 μsec/ft to 170 μsec/ft in 2 μsec/ft increments. The block 710 represents selection of the initial model parameters, which may be, for example, the lower extremes of the respective ranges.

Next, as represented by the block 715, for the kth wave type (where, generally, k=1,2, ... q), the matrix $G^k$ is formed in accordance with equation (12) as:

$$G^k F W^k(\Theta) F^T H^k(\Theta) \tag{12a}$$

Thus, for example, if there are three wave types (such as compressional, shear, and Stoneley), three matrices, $G^1$, $G^2$, and $G^3$ will be formed. Each of the matrices $W^k(\Theta)$ are filter matrices, and each of the matrices $H^k(\Theta)$ are window matrices. Typically, the window matrices will be linear with wave slowness. Again, for an example of three wave types there will be three filter matrices $W^1(\Theta)$, $W^2(\Theta)$ and $W^3(\Theta)$, and the three window matrices $H^1(\Theta)$, $H^2(\Theta)$ and $H^3(\Theta)$. In a form of the present embodiment, the window matrix is in the time domain and the filter matrix is in the frequency domain. The matrix $F^T$ represents transformation (e.g. by inverse Fourier transform) of the filter matrix to the time domain, and then, after combination with the window matrix, the matrix F represents transformation (e.g. Fourier transform) back to the frequency domain. Conversely, and as first noted above, a windowed-then-filtered approach can alternatively be employed.

The block 720 is then entered, this block representing the performing of a singular value decomposition of each matrix $G^k$, using equation (14) for decomposition of the form:

$$G^k=U^k(\Theta)L^k(\Theta)[V^k(\Theta)]^T \tag{14a}$$

where $U^k(\Theta)$ and $[V^k(\Theta)]^T$ are the dual basis for a respective decomposition for wave type k, with eigenvectors in the columns, and $L^k(\Theta)$ is a matrix with eigenvalues as non-zero diagonal entries. The columns of the dual basis matrices $U^k(\Theta)$ and $[V^k(\Theta)]^T$ are the eigenvectors. [Reference can be made, for example, to "Matrix Computations", by G. H. Golub et al., John Hopkins University Press, 1989, or to "Functional Analysis", by W. Rudin, McGraw Hill, 1973, with regard to implementation of a dual basis singular value decomposition.]

As represented by the block 728, a truncation is then performed to reduce the number of eigenvectors and obtain $r^k$ eigenvectors (that is, r eigenvectors for each of the k wave types). In particular:

$$U^k(\Theta) \rightarrow U_{r_k}^k(\Theta) \tag{28}$$

As noted above $\bar{a}_k$ is well approximated by the first $r^k$ eigenvectors of $U^k$. The restriction to $r^k$ eigenvalues/ eigenvectors removes those components of $a^k$ that were attenuated by the $G^k$ matrix.

Next, the matrices of reduced eigenvectors are utilized, in accordance with equation (16), to construct a reduced propagator, $P_e(\Theta)$, this operation being represented by the block 740. A singular value decomposition of the propagator $P_e(\Theta)$ can then be implemented (block 750), as in equation (25), to obtain $$P_e(\Theta)=U_e(\Theta)L_e(\Theta)[V_e(\Theta)]^T \quad (25a)$$

where $U_e(\Theta)$ and $[V_e(\Theta)]^T$ are the dual basis with eigenvectors in the columns and $L_e(\Theta)$ is a matrix with eigenvalues as non-zero diagonal entries. Then, as represented by the block 765, the test statistic $T(\Theta)$ is formed, in accordance with equation (26), as:

$$T(\Theta)=|U_e^T x|^2 \quad (26)$$

Inquiry is then made (decision block 770) as to whether all models (that is, all combinations of the variable parameters) have been tried. If not, the model parameters are incremented (to the next combination), as represented by the block 780, and the block 715 is re-entered. Any suitable sequence of incrementing can be utilized until all combinations have been tried. The loop 790 thus continues until the inquiry of decision block 770 is answered in the affirmative, whereupon the block 795 is entered, this block representing the selecting of the model parameters that yielded the maximum test static, and the outputting of these model parameters.

Preliminary studies have been performed to study the performance of the techniques hereof relative to existing techniques. These are computer simulations which examine performance under noise in relatively benign conditions of known non-overlapping, non dispersive waves and don't attempt to demonstrate the degree of resistance to unexpected, out-of-time-support signals. However, they provide initial insight into the advantages of the techniques hereof.

Figure 6:
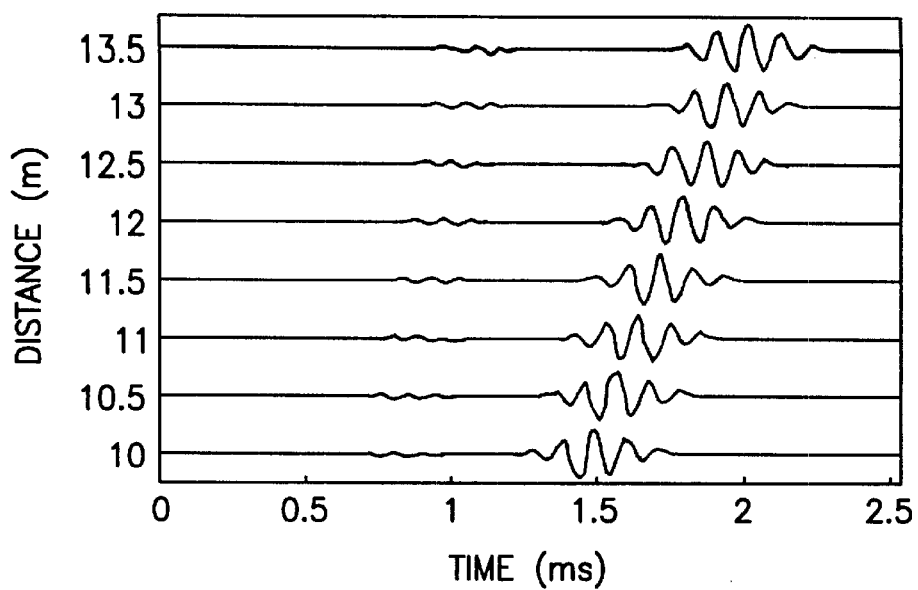
FIG. 6 illustrates an idealization of monopole compressional (P) and shear (S) wave arrivals.

Consider the two non-dispersive waveforms shown in FIG. 6 which represent an idealization of monopole P and S wave arrivals. The first wave has a center frequency of 10 kHz, a Gaussian envelope with a $2\sigma$ a width of 200 $\mu$s, and a slowness $S_1$ of 80.31 $\mu$s/ft. The second wave has a center frequency of 9 kHz, a Gaussian envelope with a $2\sigma$ width of 222 $\mu$s, and a slowness $S_2$ of 150.00 $\mu$s/ft. Both waves have been propagated over a 10 ft distance from the source to the first receiver with their slownesses. In all subsequent results, the first wave has matched-filter signal-to-noise ratio ($2E/N_0$) of 15 dB, and the second wave has a signal level 20 dB higher than the first signal.

Figure 7:
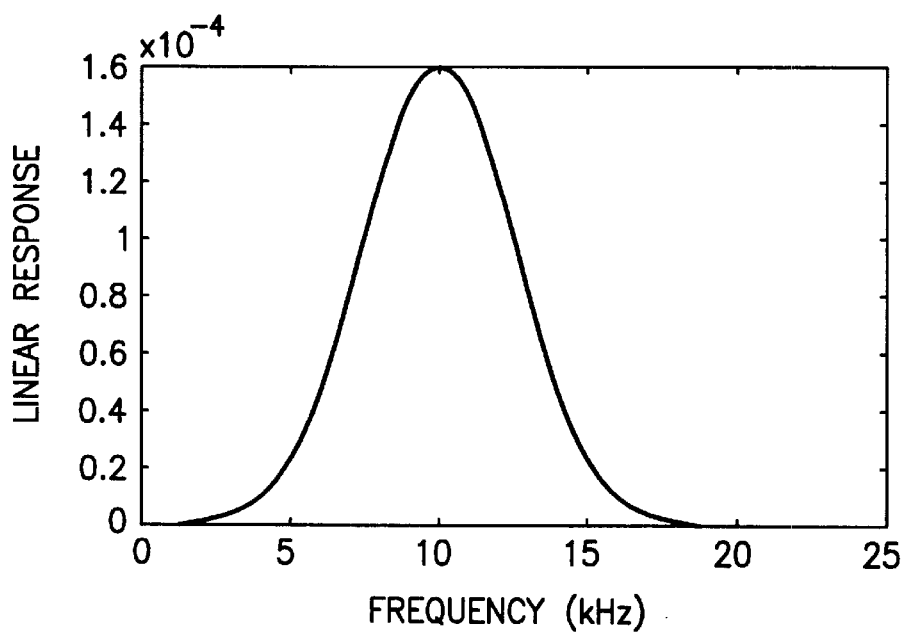
FIG. 7 is a diagram illustrating the response function of a matched Gaussian filter.

The filter is shown in FIG. 7, and has a Gaussian shape centered at 10 kHz and a $2\sigma$ bandwidth of 5 kHz. This response is applied to noisy data as part of conventional processing and can serve to construct the filter matrix H for use in the technique hereof. The filter response is the transform of the first signal and can be considered "matched" to it.

Although an objective hereof is to process multiple waves, a single wave processing of multiple waves, analogous to prior processing, is used in the demonstration, again, only to provide insight. For this section, the processing model includes only a non-dispersive wave of slowness S. The data includes both waves, however.

Figure 8:
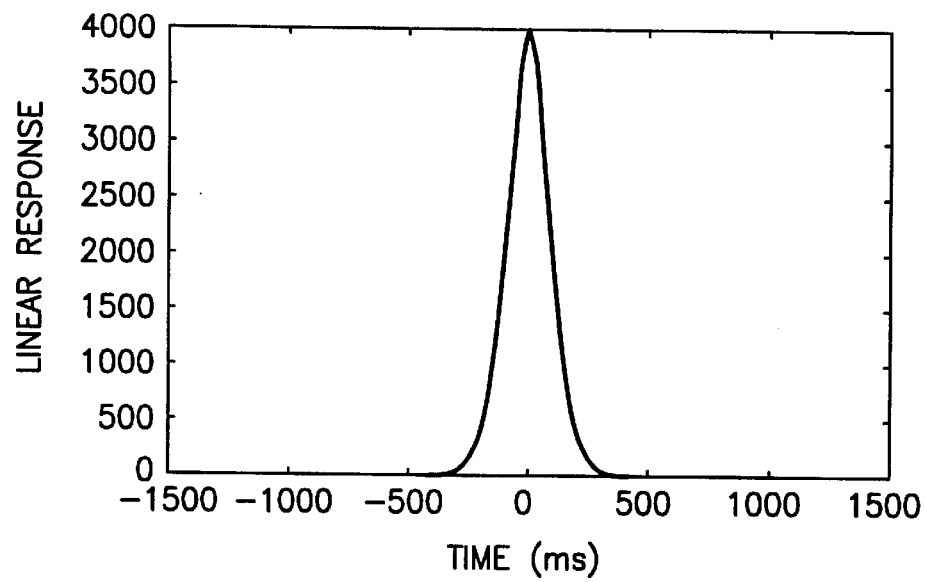
FIG. 8 is a diagram illustrating the response function of a Gaussian window of a type that can be utilized in an embodiment of the invention.

A window for the subject processing is shown in FIG. 8. This window has a Gaussian shape with a $2\sigma$ width of 200 $\mu$s centered at time t=0. The window has the same shape as the envelope of the first signal and serves to construct the W matrix for the subject technique.

Figure 9:
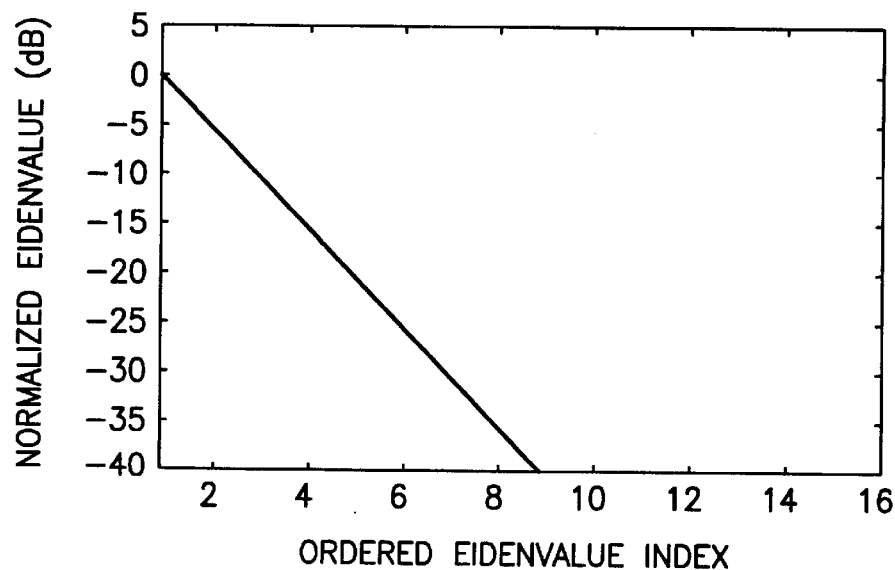
FIG. 9 is a diagram illustrating the distribution of eigenvalues for the window of FIG. 8.
Figure 10:
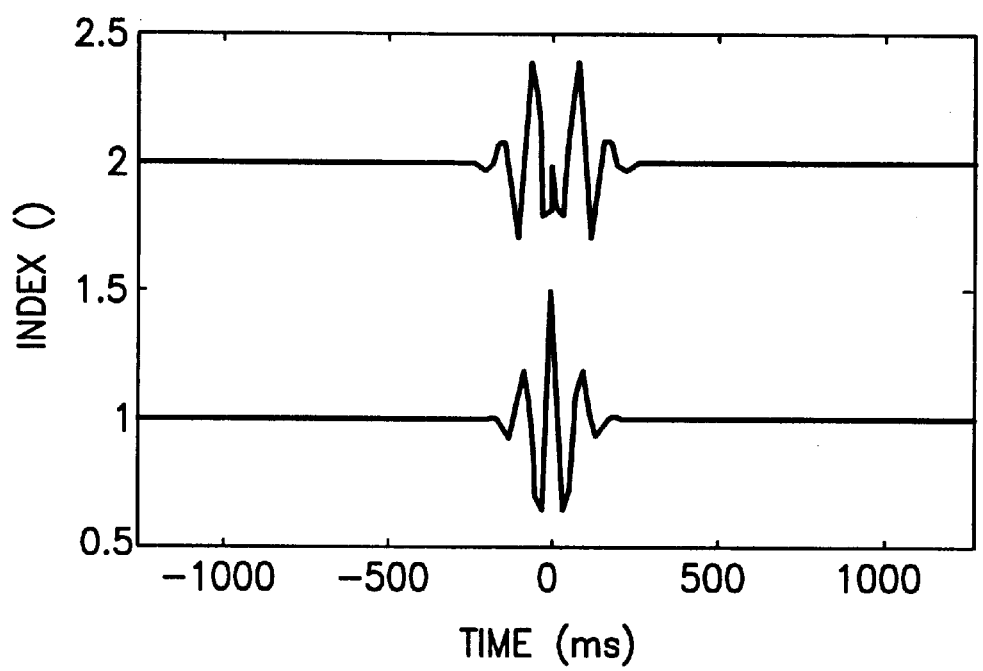
FIG. 10 is a diagram illustrating the first two eigenvectors in the time domain for the window of FIG. 8.

The matrix G is constructed from the foregoing filter and window via equation (12). The eigenvalues of G, L diminish rapidly with column index. FIG. 9 gives the normalized eigenvalues of G in decibels as a function of column index. For this simulation, only two eigenvalues were retained, that is, r=2. The corresponding eigenvectors, in the time domain, are shown in FIG. 10.

Figure 11:
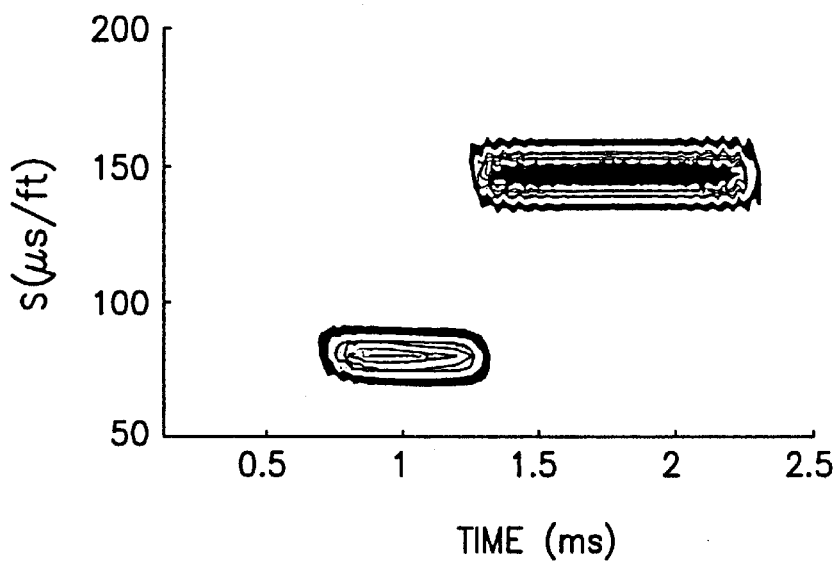
FIG. 11 depicts the slowness/time plane for the waves of FIG. 6 obtained using a prior art processing technique.

FIG. 11 depicts the slowness/time plane for the waves of FIG. 6 obtained with a prior art processing technique of the r type set forth in U.S. Pat. No. 5,278,805. The window length is 600 $\mu$s and the data is pre-filtered with the above filter before processing.

Figure 12:
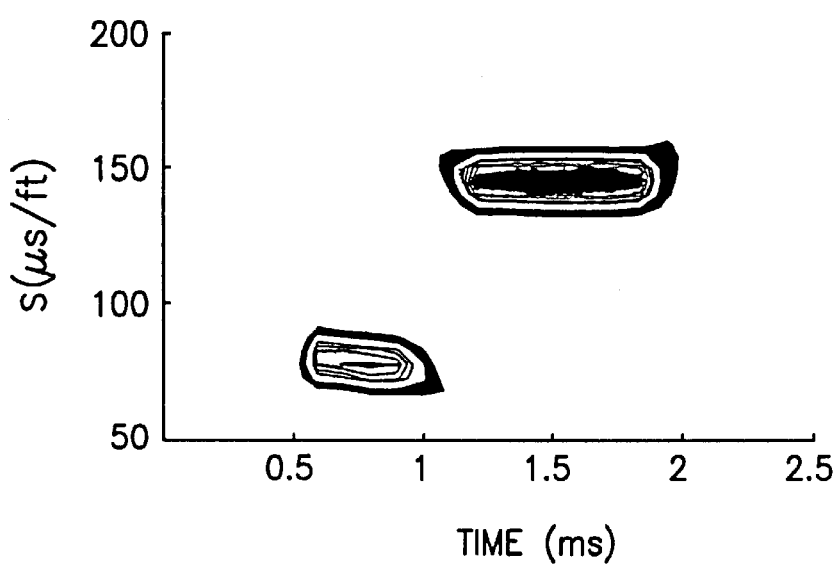
FIG. 12 depicts the slowness/time plane for a processing technique in accordance with an embodiment of the invention.

FIG. 12 depicts the slowness/time plane for the technique hereof. Here, the position of the window in the first waveform is adjusted from 0 to 2.4 ms in steps of 100 $\mu$s by changing W. The results are seen to be similar to those of FIG. 11.

Figure 13:
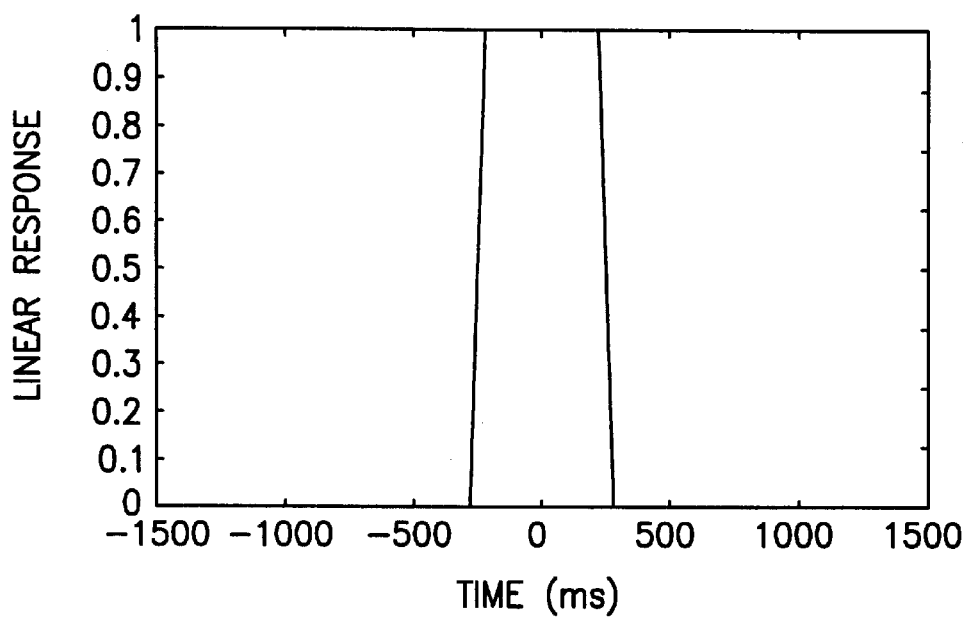
FIG. 13 depicts the response characteristic of a cosine-tapered window that can be utilized in an embodiment of the invention.
Figure 14:
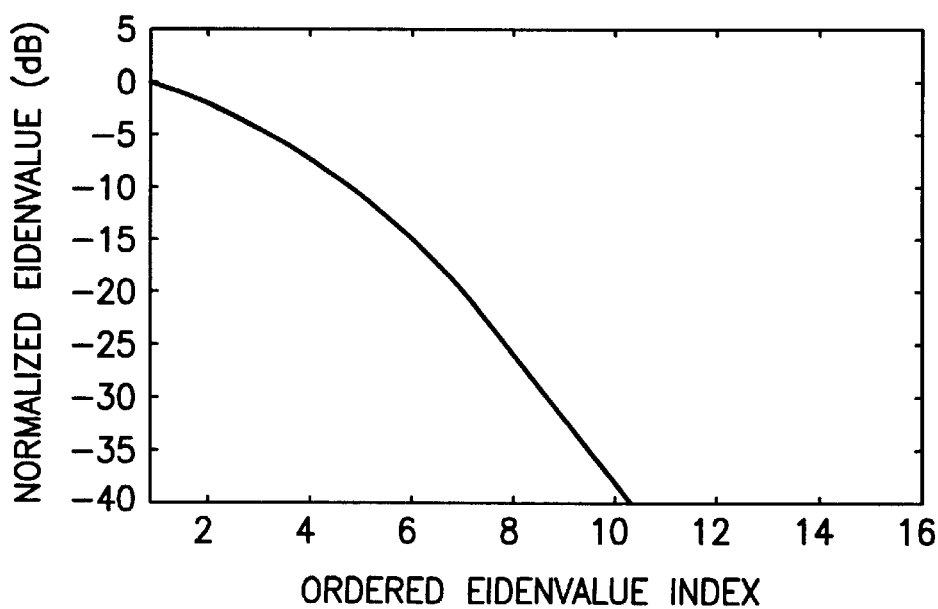
FIG. 14 is a diagram that illustrates the distribution of eigenvalues when a matrix G is formed from the filter of FIG. 8 and the window of FIG. 3.
Figure 15:
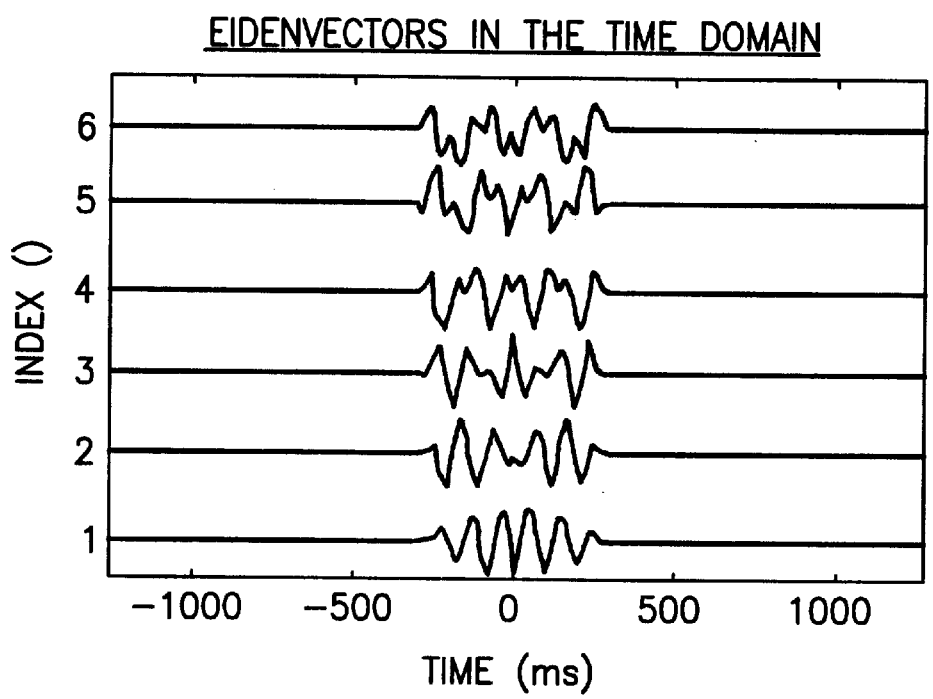
FIG. 15 depicts the first six eigenvectors in the time domain for the window of FIG. 13.

The processing in FIG. 12 performs the same search for window positions as in the prior technique. A feature of the present technique is to place the time window uncertainty in the orthonormal basis. The 200 $\mu$s Gaussian window shown in FIG. 8 is too tight to include this uncertainty, and a broader window is required. FIG. 13 depicts a cosine-tapered window of overall duration 600 $\mu$s. When G is formed from this window and the previous Gaussian filter, the normalized eigenvalues are distributed as shown in FIG. 14. The corresponding eigenvectors, in the time domain, are shown in FIG. 15.

A Monte Carlo evaluation of the processing technique hereof using the cosine-tapered window and of the prior art technique was made with statistics accumulated for 3000 trials. To avoid the peak labelling problem, the slowness search range for both types of processing was limited to 70 to 90 $\mu$s/ft, with 2 $\mu$s/ft increments. Both processing techniques use the same quadratic fit to 5 points algorithm to determine the estimate. The second wave remained in the input data. The processing technique hereof used a tapered cosine window centered at 800 $\mu$s in the first waveform, and the prior art processing technique searched the entire time axis. The Cramer-Rao bound on the single-wave estimation gives a limiting standard deviation of the slowness measurement of 0.87 $\mu$s/ft. Both processing techniques yielded unbiased results with standard deviations of 0.90 $\mu$s/ft.

A second Monte Carlo experiment with 4000 trials was performed with both processings have a longer window length of 1200 $\mu$s. The increased window length allows some leakage of the second wave onto the window of the first wave. The new processing retained $r^k=12$ eigenvectors. Here, the prior art technique had a bias of 0.04 $\mu$s/ft and a standard deviation of 0.92 $\mu$s us/ft. The processing technique hereof had a trivially smaller bias of 0.03 $\mu$s/ft and a larger standard deviation of 0.97 $\mu$s/ft.

The processing technique hereof is intended primarily for multiple waves and was applied as a two-wave processing to the previous data.

Figure 16:
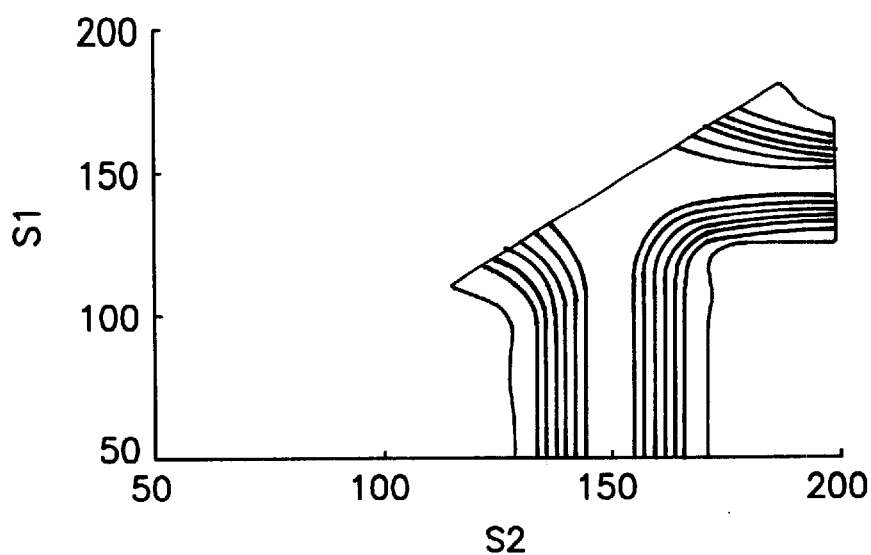
FIG. 16 is a contour plot illustrating a two-wave LMSE semblance over the $(S_1, S_2)$ slowness plane for a conventional unwindowed LMSE estimator.

FIG. 16 depicts contours of semblance over the ($S_1$, $S_2$) plane for the conventional unwindowed LMSE estimator. The figure is symmetric about the diagonal because the processing can't label which arrival is the first wave and which is the second wave. Because the second wave is so much stronger (20 dB) than the first wave, a large ridge line exists at 150 $\mu$s/ft for either $S_1$ or $S_2$. Closer inspection shows a slight bump on the ridge line at the correct answer of $S_1$=80, $S_2$=150 $\mu$s/ft.

Figure 17:
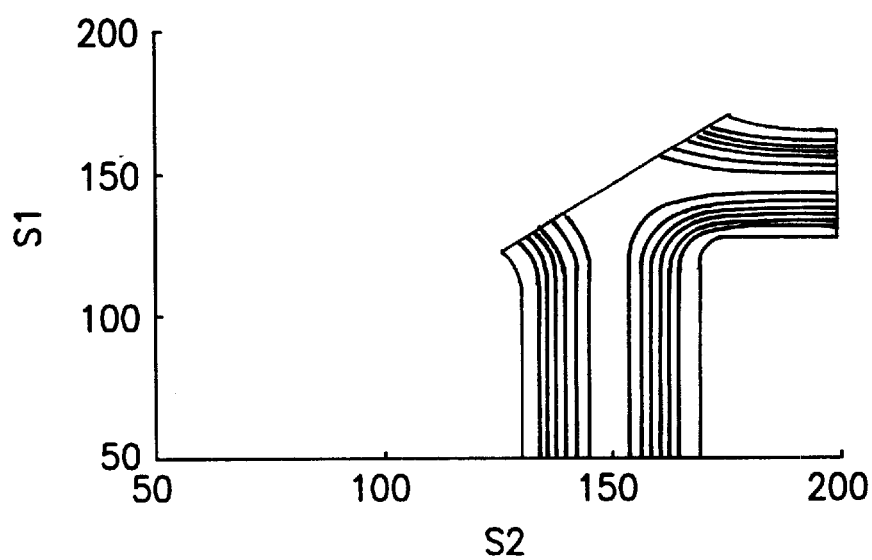
FIG. 17 is a contour plot of the contours of semblance over the $(S_1, S_2)$ plane for an example of an embodiment of the invention, using the cosine-tapered window of FIG. 13.

FIG. 17 depicts contours of semblance over the ($S_1$, $S_2$) plane for the technique hereof, using the cosine-tapered window. The ridge lines are narrower than in the LMSE case. The "bump" at the correct answer of $S_1$=80, $S_2$=150 µs/ft is more distinct than in the LMSE plot.

Figures 18, 19:
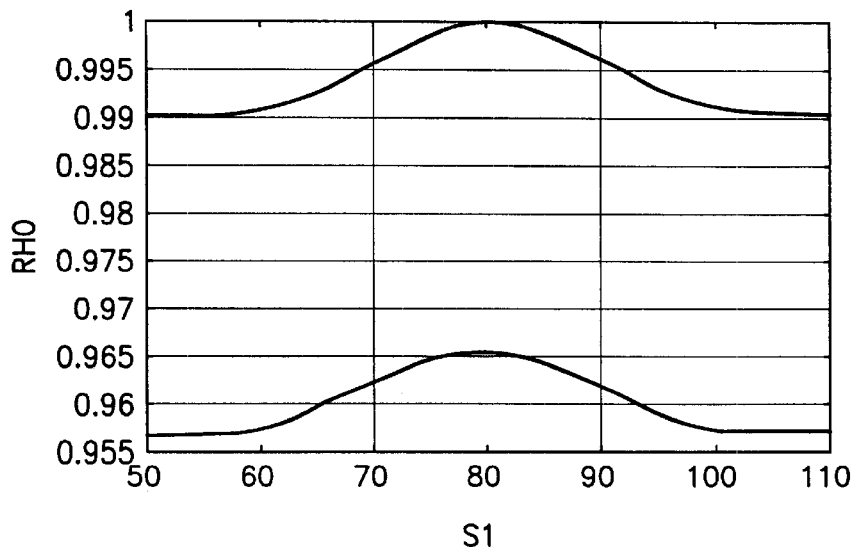
FIG. 18 shows a comparison of the two-wave semblances of FIGS. 16 and 17 as a function of $S_1$ for a particular $S_2$.
FIG. 19 is a Table which shows comparative results of different techniques for different window sizes.

FIG. 18 provides a cross section of semblances of the previous contour plots at a constant $S_2$=150 µs/ft. This is the test static that would be available to the processings after an estimate of $S_2$ was made. (Because of the high levels (35 dB) of the second wave, estimation of its slowness is a trivial problem.) The curves have similar shapes in the vicinity of 80 µs/ft.

Monte Carlo evaluations of the present and conventional two-wave processing techniques were made to explore performance under added white Gaussian noise.

In addition to the conventional, LMSE processing, a windowed LMSE processing was also evaluated. In this processing a rectangular window is applied to the data before applying conventional LMSE processing. On each wave, a rectangular window centered at t=0 at the source having a window length of either 600 or 1200 µs is defined. Because the individual wave windows may overlap, the overall window is formed by the logical "OR" of the individual wave windows. That is, if a data point fits in any wave window, then it is passed to the LMSE processing.

The Table of FIG. 19 depicts the means and standard deviations of the $S_1$ slowness estimates over 10,000 Monte Carlo trials. The search over the slowness $S_2$ was nullified by setting $S_2$=150 µs/ft to save computation time. The Cramer-Rao bound on the standard deviation of the conventional LMSE estimate of $S_1$ is 0.88 µs/ft.

The conventional LMSE estimator doesn't depend on window length; thus, the results listed for this estimator at the two different window lengths represent independent statistics of the same quantities over independent trials. As expected, the LMSE estimator is nearly unbiased. The measured standard deviation is greater than the Cramer-Rao bound by 36%.

For the short, 600 µs window, the windowed LMSE estimator is nearly unbiased and has a standard deviation slightly better than the LMSE estimator. The 600 µs window fully encloses each wave without truncation or overlap. For the longer 1200 µs window, the windowed LMSE estimator is severely biased and has a larger standard deviation than the LMSE estimator. Overlap of the longer windows is the likely cause of this result.

To each of the two waves, the new processing applied equal cosine-tapered windows with $r^k$=6 for the 600 µs window length and $r^k$=12 for the 1200 µs window length. The $P_e$ matrix sizes were 512×12 and 512×24, respectively.

η for the LMSE estimator is 7.9. For the processing technique hereof, Θ is 73.1 for the 600 µs window and 39.3 for the 1200 µs window. Thus, the processing technique hereof has potentially greater processing gain than LMSE processing.

The processing technique hereof gives nearly unbiased results for either window length. The standard deviations for this processing technique are less than those of either version of LMSE processing. The longer, 1200 µs, window has a slightly larger standard deviation because of its larger degrees of freedom (24 vs 12).

The foregoing multiwave processing results were presented for two non-dispersive waves and were based on filters and windows designed to fit those waves. Since dispersive waves are approximately non-dispersive in narrow bands, a version of the processing technique hereof having narrow filters $H^k$ could provide dispersion analysis of unknown waves. This would allow expression-of the physical constraint of limited time which isn't currently available in existing methods.

The invention has been described with reference to particular preferred embodiments, but variations within the spirit and scope of the invention will occur to those skilled in the art. For example, although the described embodiment is set forth in terms of wireline logging, it will be understood that the invention can also be applied in logging-while-drilling.

What is claimed is:

1. A method for determining acoustic properties of earth formations surrounding a borehole, comprising the steps of:
    (a) transmitting acoustic energy from a transmitter location and receiving acoustic energy at a plurality of receiver locations in the borehole, at least a portion of the received acoustic energy having travelled through the formations;
    (b) deriving data signals from the acoustic energy add received at said receiver locations;
    (c) selecting model values of said acoustic properties;
    (d) producing an intermediate matrix that is a function of a window matrix, said window matrix being a function of at least one of said model values;
    (e) performing a singular value decomposition on said intermediate matrix to obtain a basis matrix of eigenvectors;
    (f) deriving a propagator matrix as a function of said model values;
    (g) producing a reduced propagator matrix from said propagator matrix and said basis matrix;
    (h) producing a test statistic using said data signals and said reduced propagator matrix; and
    (i) repeating steps (c) through (h) for different combinations of model values, and selecting, as output acoustic property values, the combination of model values that results in a maximized test statistic.

2. The method as defined by claim 1, wherein said steps (d), (e), and (f) are each performed for a plurality of different wave types.

3. The method as defined by claim 2, wherein said plurality of different wave types include compressional waves and shear waves.

4. The method as defined by claim 3, wherein said plurality of different wave types further includes Stoneley waves.

5. The method as defined by claim 1, wherein said step (e) of performing a singular value decomposition on said intermediate matrix to obtain a basis matrix of eigenvectors further includes truncating said eigenvectors of said basis matrix to produce a reduced basis matrix, and wherein said step (g) comprises producing said reduced propagator matrix from said propagator matrix and said reduced basis matrix.

6. The method as defined by claim 2, wherein said step (e) of performing a singular value decomposition on said intermediate matrix to obtain a basis matrix of eigenvectors further includes truncating said eigenvectors of said basis matrix to produce a reduced basis matrix, and wherein said step (g) comprises producing said reduced propagator matrix from said propagator matrix and said reduced basis matrix.

7. The method as defined by claim 5, wherein said step (d) of producing an intermediate matrix comprises producing an intermediate matrix that is also a function of a filter matrix.

8. The method as defined by claim 6, wherein said step (d) of producing an intermediate matrix comprises producing an intermediate matrix that is also a function of a filter matrix.

9. The method as defined by claim 7, wherein said filter matrix is a function of at least one of said model values.

10. The method as defined by claim 9, wherein said window matrix is a time domain matrix and said filter matrix is a frequency domain matrix.

11. The method as defined by claim 10, wherein said intermediate matrix is formed by transforming said window matrix to the frequency domain, implementing filtering on the transformed window matrix, and transforming the result to the time domain.

12. The method as defined by claim 2, wherein said step (h) further comprises performing a singular value decomposition on said reduced propagator matrix to obtain a reduced propagator basis matrix, and wherein said step (h) comprises producing said test statistic using said data signals and said reduced propagator basis matrix.

13. The method as defined by claim 5, wherein said step (h) further comprises performing a singular value decomposition on said reduced propagator matrix to obtain a reduced propagator basis matrix, and wherein said step (h) comprises producing said test statistic using said data signals and said reduced propagator basis matrix.

14. The method as defined by claim 5, wherein said step (e) of performing a singular value decomposition on said intermediate matrix is implemented to obtain dual basis matrices of eigenvectors.

15. The method as defined by claim 3, wherein said acoustic properties include formation compressional slowness and formation shear slowness.

16. The method as defined by claim 6, wherein said acoustic properties include formation compressional slowness and formation shear slowness.

17. The method as defined by claim 15, wherein said acoustic properties further include the formation/fluid density ratio.

18. The method as defined by claim 15, wherein said acoustic properties further include the borehole fluid slowness.

19. The method as defined by claim 15, wherein said acoustic properties further include the borehole diameter.

20. The method as defined by claim 2, wherein said acoustic properties include a plurality of properties selected from the group consisting of formation compressional slowness, formation shear slowness, the formation/fluid density ratio, the borehole fluid slowness, and the borehole diameter.

21. The method as defined by claim 5, wherein said acoustic properties include a plurality of properties selected from the group consisting of formation compressional slowness, formation shear slowness, the formation/fluid density ratio, the borehole fluid slowness, and the borehole diameter.

22. The method as defined by claim 1, wherein said method is repeated for a plurality of different transmitter locations in the borehole and respective receiver locations in the borehole, and further comprising producing a log of said determined acoustic properties.

23. A method for determining acoustic properties of earth formations surrounding a borehole, comprising the steps of:
(a) suspending a logging device in the borehole;
(b) transmitting acoustic energy from a transmitter location on the logging device and receiving acoustic energy at a plurality of receiver locations on the logging device, at least a portion of the received acoustic energy having travelled through the formations;
(c) deriving data signals from the acoustic energy received at said receiver locations;
(d) selecting model values of said acoustic properties;
(e) producing an intermediate matrix that is a function of a window matrix and a filter matrix, said window matrix being a function of at least one of said model values and said filter matrix being a function of at least one of said model values;
(f) performing a singular value decomposition on said intermediate matrix to obtain a basis matrix of eigenvectors;
(g) truncating the eigenvectors of said basis matrix to produce a reduced basis matrix;
(h) deriving a propagator matrix as a function of said model values;
(i) producing a reduced propagator matrix from said propagator matrix and said reduced basis matrix;
(j) performing a singular value decomposition on said reduced propagator matrix to obtain a reduced propagator basis matrix;
(k) producing a test statistic using said data signals and said reduced propagator basis matrix; and
(l) repeating steps (d) through (j) for different combinations of model values, and selecting, as output acoustic property values, the combination of model values that results in a maximized test statistic.

24. The method as defined by claim 23, wherein said steps (e), (f), (g) and (h) are each performed for a plurality of different wave types.

25. The method as defined by claim 24, wherein said plurality of different wave types include compressional waves and shear waves.

26. The method as defined by claim 25, wherein said plurality of different wave types further includes Stoneley waves.

27. The method as defined by claim 23, wherein said window matrix is a time domain matrix and said filter matrix is a frequency domain matrix.

28. The method as defined by claim 27, wherein said intermediate matrix is formed by transforming said window matrix to the frequency domain, implementing filtering on the transformed window matrix, and transforming the result to the time domain.

29. The method as defined by claim 23, wherein said step (f) of performing a singular value decomposition on said intermediate matrix is implemented to obtain dual basis matrices of eigenvectors.

30. The method as defined by claim 23, wherein said acoustic properties include formation compressional slowness and formation shear slowness.

31. The method as defined by claim 30, wherein said acoustic properties further include the formation/fluid density ratio.

32. The method as defined by claim 30, wherein said acoustic properties further include the borehole fluid slowness.

33. The method as defined by claim 30, wherein said acoustic properties further include the borehole diameter.

34. The method as defined by claim 23, wherein said acoustic properties include a plurality of properties selected from the group consisting of formation compressional slowness, formation shear slowness, the formation/fluid density ratio, the borehole fluid slowness, and the borehole diameter.

35. The method as defined by claim 23, wherein said method is repeated for a plurality of different locations of said logging device in the borehole and further comprising producing a log of said determined acoustic properties.

36. A method for determining acoustic properties of earth formations surrounding a borehole, comprising the steps of:

(a) transmitting acoustic energy from a transmitter location and receiving acoustic energy at a plurality of receiver locations in the borehole, at least a portion of the received acoustic energy having traveled through the formations;

(b) deriving data signals from the acoustic energy received at said receiver locations;

(c) selecting model values of said acoustic properties;

(d) deriving a propagator matrix P as a function of said model values;

(e) defining, for each of a plurality q of wave types, an orthonormal basis $U_1, U_2 \ldots U_q$ that includes windowing and filtering characteristics;

(f) producing a reduced propagator matrix, $P_e$, from said propagator matrix P and said orthonormal basis $U_1, U_2 \ldots U_q$;

(g) producing an error indication using said data signals and said reduced propagator matrix; and (h) repeating steps (c) through (h) for different combinations of model values, and selecting, as output acoustic property values, the combination of model values that results in minimizing the error indication.

37. The method as defined by claim 36, wherein said step (h) includes selecting, as output acoustic property values, the combination of model values that results in a maximized test statistic.

38. The method as defined by claim 36, wherein said plurality of different wave types include compressional waves and shear waves.

39. The method as defined by claim 38, wherein said plurality of different wave types further includes Stoneley waves.

40. The method as defined by claim 36, wherein said step of defining, for each of a plurality q of wave types, an orthonormal basis, includes forming, for each of said wave types, a matrix G, performing a singular valve decomposition, for each wave type, to obtain eigenvectors, and, for each wave type, truncating the eigenvectors to obtain a reduced basis, and wherein said reduced propagator matrix, $P_e$, is produced from said propagator matrix and a matrix of said truncated eigenvectors.

41. The method as defined by claim 38, wherein said step of defining, for each of a plurality q of wave types, an orthonormal basis, includes forming, for each of said wave types, a matrix G, performing a singular valve decomposition, for each wave type, to obtain eigenvectors, and, for each wave type, truncating the eigenvectors to obtain a reduced basis, and wherein said reduced propagator matrix, $P_e$, is produced from said propagator matrix and a matrix of said truncated eigenvectors.

42. The method as defined by claim 36, wherein said step (g) further comprises performing a singular value decomposition on said reduced propagator matrix to obtain a reduced propagator basis matrix, and wherein said step (h) comprises producing said error indication using said data signals and said reduced propagator basis matrix.

43. The method as defined by claim 40, wherein said step (g) further comprises performing a singular value decomposition on said reduced propagator matrix to obtain a reduced propagator basis matrix, and wherein said step (g) comprises producing said error indication using said data signals and said reduced propagator basis matrix.

44. The method as defined by claim 36, wherein said acoustic properties include formation compressional slowness and formation shear slowness.

45. The method as defined by claim 40, wherein said acoustic properties include formation compressional slowness and formation shear slowness.

46. The method as defined by claim 44, wherein said acoustic properties further include the formation/fluid density ratio.

47. The method as defined by claim 44, wherein said acoustic properties further include the borehole fluid slowness.

48. The method as defined by claim 44, wherein said acoustic properties further include the borehole diameter.

49. The method as defined by claim 36, wherein said acoustic properties include a plurality of properties selected from the group consisting of formation compressional slowness, formation shear slowness, the formation/fluid density ratio, the borehole fluid slowness, and the borehole diameter.

50. The method as defined by claim 36, wherein said method is repeated for a plurality of different transmitter locations in the borehole and respective receiver locations in the borehole, and further comprising producing a log of said determined acoustic properties.

* * * * *